United States Patent
Kröpfl et al.

(10) Patent No.: US 7,338,057 B2
(45) Date of Patent: Mar. 4, 2008

(54) REAR-AXLE SUSPENSION FOR MOTOR VEHICLES INVOLVING THE USE OF LONGITUDINAL AND TRANSVERSE LINKS

(75) Inventors: Peter Kröpfl, Hausmannstätten (AT); Walter Schimpl, Graz (AT)

(73) Assignee: Magna Steyr Fahrzeugtechnik AG & Co. KG, Graz (AU)

( * ) Notice: Subject to any disclaimer, the term of this patent is extended or adjusted under 35 U.S.C. 154(b) by 469 days.

(21) Appl. No.: 10/472,475

(22) PCT Filed: Jul. 18, 2001

(86) PCT No.: PCT/AT01/00242

§ 371 (c)(1),
(2), (4) Date: Apr. 1, 2004

(87) PCT Pub. No.: WO02/076172

PCT Pub. Date: Oct. 3, 2002

(65) Prior Publication Data

US 2004/0150182 A1    Aug. 5, 2004

(30) Foreign Application Priority Data

Mar. 23, 2001  (GM) .................................. 218/2001

(51) Int. Cl.
*B60G 3/04* (2006.01)
(52) U.S. Cl. ............................ 280/124.134; 280/5.502; 280/5.506; 280/5.507
(58) Field of Classification Search ............ 280/5.502, 280/5.506, 5.507, 5.508, 5.511, 5.52, 5.521, 280/5.524, 124.116, 124.128, 124.134, 124.137
See application file for complete search history.

(56) References Cited

U.S. PATENT DOCUMENTS

| | | | | |
|---|---|---|---|---|
| 2,660,449 A | * | 11/1953 | MacPherson | 280/124.149 |
| 2,961,253 A | * | 11/1960 | Allison | 280/124.106 |
| 4,078,830 A | | 3/1978 | Urushiyama et al. | |
| 4,458,915 A | * | 7/1984 | Emery | 280/5.524 |
| 4,542,920 A | * | 9/1985 | Kijima et al. | 280/5.524 |
| 4,550,926 A | * | 11/1985 | MacIsaac | 280/5.509 |
| 4,784,406 A | * | 11/1988 | Stinson | 280/124.154 |
| 5,401,049 A | * | 3/1995 | Richardson | 280/124.134 |
| 6,517,094 B1 | * | 2/2003 | Kincaid et al. | 280/124.106 |
| 6,793,228 B2 | * | 9/2004 | Zadok | 280/124.134 |

FOREIGN PATENT DOCUMENTS

| | | |
|---|---|---|
| DE | 1 031 652 | 6/1958 |
| GB | 2 296 223 | 6/1996 |
| WO | WO 01/79009 | 10/2001 |

* cited by examiner

*Primary Examiner*—Paul N. Dickson
*Assistant Examiner*—Toan C. To
(74) *Attorney, Agent, or Firm*—Bachman & LaPointe, P.C.

(57) ABSTRACT

Rear axle suspension system for motor vehicles, in which the wheel carriers on both sides are coupled to the body of the vehicle by at least one longitudinal link (9, 10), one transverse link (12) and a further transverse link (15, 16). In order to ensure that the axle kinematics distinguish between spring compression in the same direction and spring compression in opposite directions and a side force steering effect occurs, the transverse link (12) is a single connecting link which is connected to the two wheel carriers (3, 4) via first joints (5, 6) and connects both wheel carriers (3, 4), and the center of which (19) is guided, with respect to the body of the vehicle, in the longitudinal center plane of the vehicle, by a straight-guide (20 to 24). The straight-guide (20 to 24) is a Watt linkage (23, 24, 20).

10 Claims, 3 Drawing Sheets

REAR-AXLE SUSPENSION FOR MOTOR VEHICLES INVOLVING THE USE OF LONGITUDINAL AND TRANSVERSE LINKS

BACKGROUND OF THE INVENTION

The invention relates to a rear axle suspension system for motor vehicles, in which the wheel carriers on both sides are coupled to the body of the vehicle in the transverse direction by means of at least one longitudinal link, one transverse link and a further guiding means. Such axle suspension systems are referred to as a longitudinal double transverse link axle or as a spherical double transverse link axle (Matschinsky: Die Radführung der Straßenfahrzeuge [Wheel guidance of road vehicles], Verlag TÜV Rheinland 1987, page 23). They may either be a driven or a non-driven axle.

The self-steering behavior of individual wheel suspension systems is usually configured so as to understeer for reasons of the dynamics of vehicle movement because this has a positive effect on driving safety when going round bends. However, it is disadvantageous that the steering movement of the wheel is less favorable in the driving behavior during spring compression when traveling straight ahead.

However, generally it is desirable to have a wheel suspension system which exhibits only a slight change in wheel position when traveling straight ahead but when cornering has a high degree of support of the lateral force, corresponding to a high rolling center. A perceptible change in the camber when cornering is also desired in order to compensate for the rolling movement of the vehicle body. Furthermore, if possible, there should be a tendency for the toe-in change in the direction of rolling understeering under the action of the side force.

Such a rear axle suspension system is known from DE 31 36 125 Cl, the further guiding means in the transverse direction being an upper transverse link. A coupling element is coupled to said transverse link and the lower transverse links are in turn coupled to it. As a result, when there is spring compression of both wheels in the same direction only slight changes in tracking and camber occur, but relatively large changes occur when there is spring compression in opposite directions. The length of the links remains however unchanged here so that the axle kinematics remain unchanged by this. In addition, it is not possible to achieve a side force steering effect in this way.

DE 36 34 090 A1 describes a rear axle steering system which is not of the generic type and in which an axle body which is rigid per se is guided at the wheel end on longitudinal links and in the center by means of a Watt linkage. The latter is intended to permit an elastic longitudinal, movement of the wheels without self-steering movement by virtue of a number of elastic connections. For this purpose, it is necessary to match the various elasticities, which is very difficult. Moreover, this axle structure acts kinematically like a conventional rigid axle which is guided by means of longitudinal links and a Watt linkage.

FR-A-1.191.743 discloses a wheel suspension system using a connecting transverse link and, on both sides, a further guiding means in the transverse direction, the transverse link being laterally supported by means of a straight-guiding means. As no longitudinal link is provided, the kinematics of a double transverse link axle whose lower transverse links are very long are obtained without any steering effects.

The object of the invention is thus to propose a rear axle suspension system of the generic type whose axle kinematics distinguish between spring compression in the same direction and spring compression in opposite directions and also permit the introduction of a side force steering effect, in particular in the direction of understeering.

SUMMARY OF THE INVENTION

The foregoing object is achieved according to the invention in that the transverse link is a single connection link which is connected to the two wheel carriers via first joints and connects the two wheel carriers and the center of which is guided, with respect to the body of the vehicle, essentially in the longitudinal center plane of the vehicle by means of a straight-guiding means, and in that the longitudinal links are permanently connected to the wheel carriers. The connecting link itself cannot be pivoted about a fixed point on the body of the vehicle by means of a joint on the body of the vehicle, but rather about a point which can move approximately vertically in relation to the body of the vehicle. This means that this point is essentially guided in the longitudinal center plane of the vehicle, and thus in the transverse direction of the vehicle. As a result of the fact that the longitudinal links are permanently connected to the wheel carriers, a side force steering effect by means of which the desired travel behavior in bends is achieved is additionally obtained through interaction with the connecting link.

The point in the center of the connecting link remains unchanged in position when there is spring compression in opposite directions (as a result of the lateral incline of the body of the vehicle when cornering), and the connecting link therefore acts as a transverse link which is coupled at this point in the center, but when there is spring compression in opposite directions it acts as an infinitely long transverse link; and when there is spring compression on one side it acts as a transverse link whose length is that of the entire connecting link. As a result, different wheel setting changes are obtained with spring compression in the same direction and with spring compression in the opposite direction.

As a result, the entire axle kinematics change as a function of the type of spring compression.

There are various possibilities for straight guidance or only approximate straight guidance. One particularly simple straight-guiding means is a Watt linkage which is composed of two rockers and a coupling which are arranged essentially in a plane which is vertical with respect to the direction of travel. The point in the center of the transverse link is therefore guided in the transverse direction of the vehicle, in which case it normally moves in a vertical line. In order to achieve particular effects in terms of dynamics of vehicle movement, it is possible also to deviate from the vertical.

In one preferred embodiment, the first joints to which the connecting link is coupled are arranged on the wheel carriers at the bottom, and the connecting link is connected to the coupling of the Watt linkage, in the symmetry of the connecting line of the two first joints, by means of a second joint which is arranged above the connecting line. This results in a favorably high position of the rolling center for spring compression in opposite directions, and generally optimum change in the wheel camber.

In one advantageous embodiment of the axle suspension system, McPherson telescopic legs are used. The further guiding means in the transverse direction is therefore a telescopic guiding means between the wheel carrier and the body of the vehicle, and the longitudinal link is connected in articulated fashion to the wheel carrier.

In one preferred embodiment, the further guiding means in the transverse direction is a transverse link which acts on the wheel carrier at the top by means of a third joint, and the first joint is arranged below and behind the third joint in the direction of travel.

BRIEF DESCRIPTION OF THE DRAWINGS

The invention is described and explained in what follows by schematic representations of a preferred exemplary embodiment, in which.

DETAILED DESCRIPTION

Figure 1:
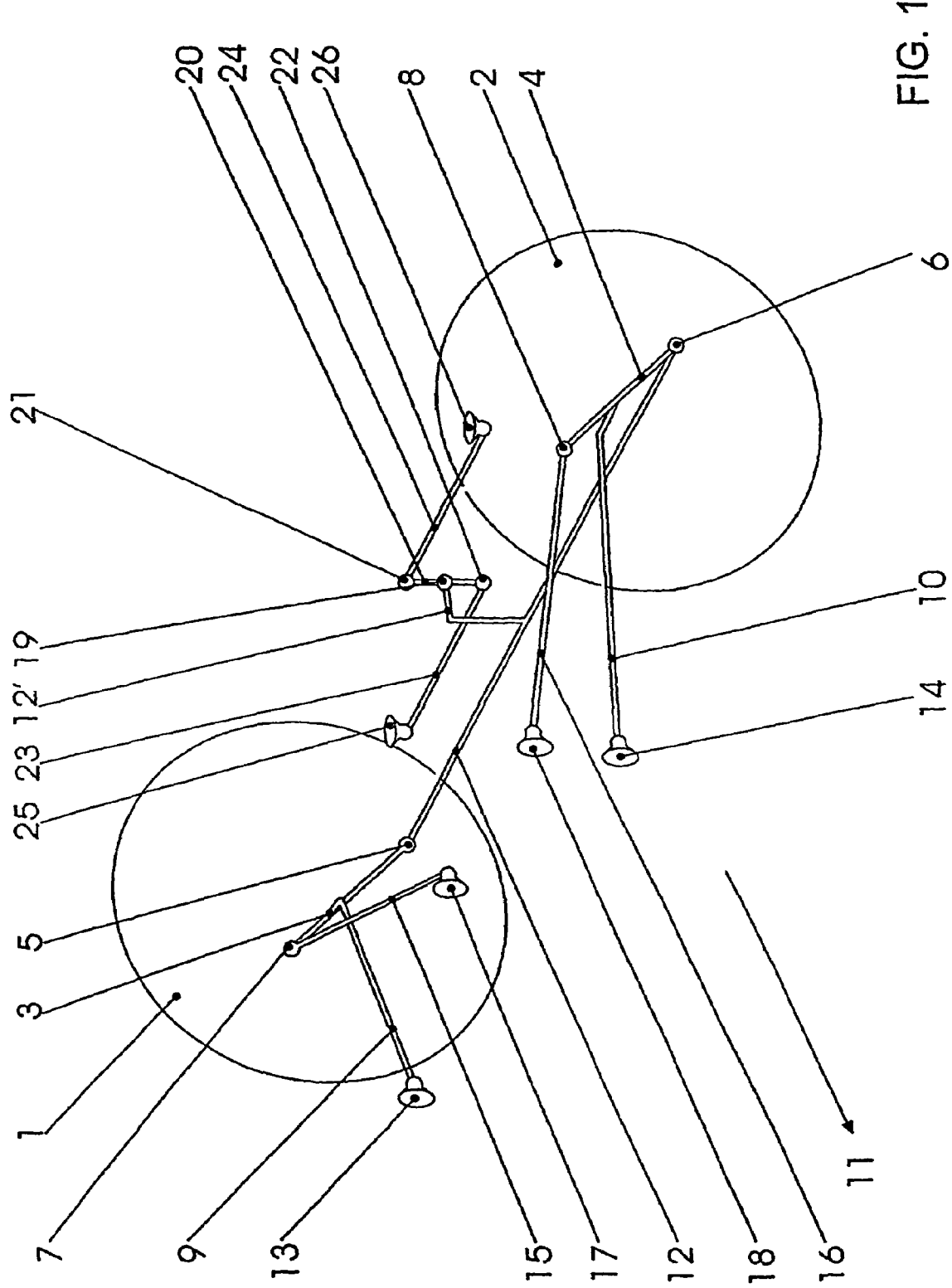
FIG. 1: shows an axonometric representation.
Figure 2:
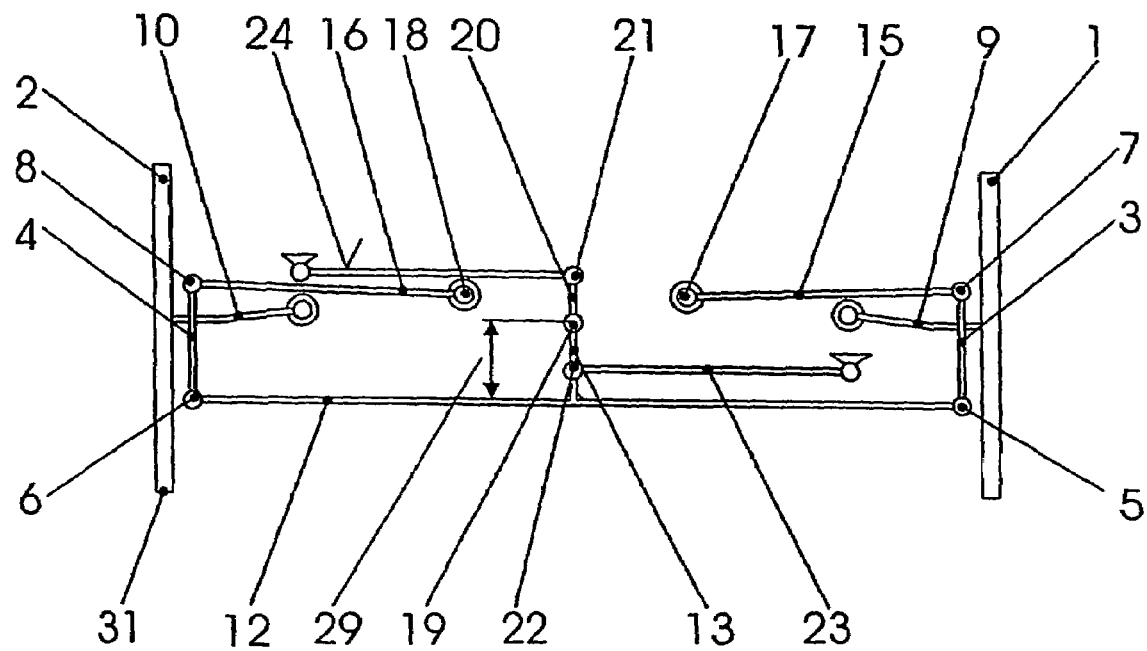
FIG. 2: is a horizontal view from behind.
Figure 3:
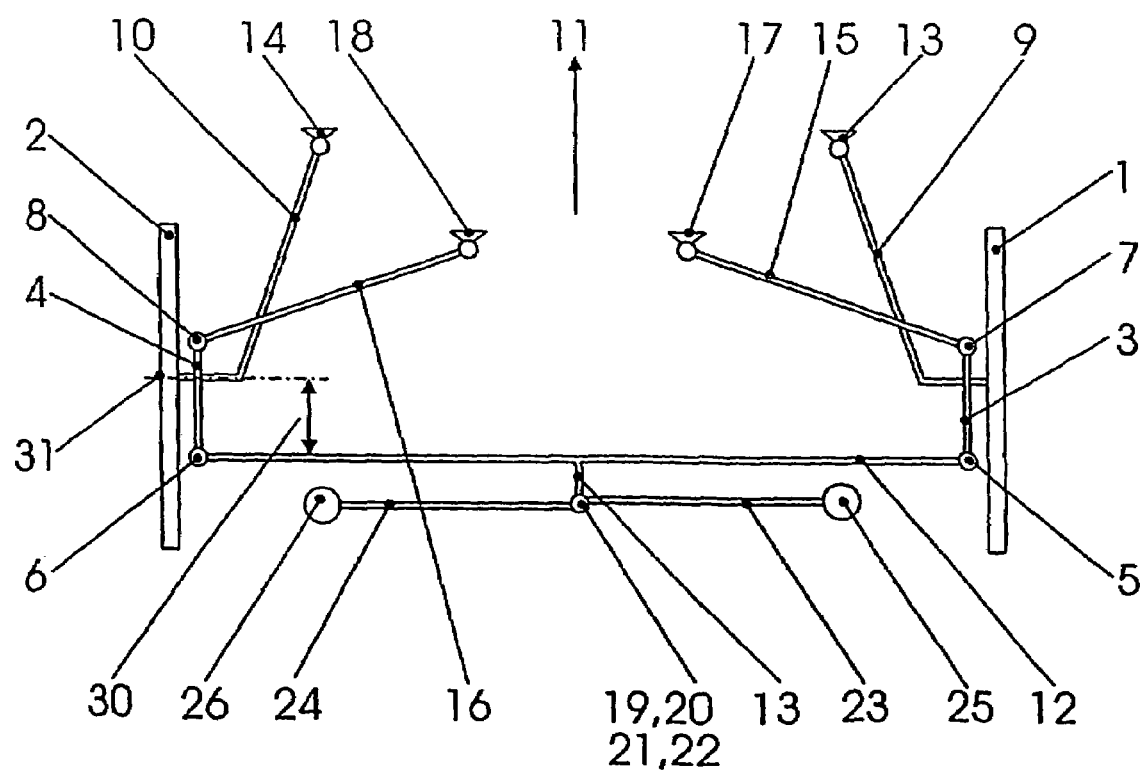
FIG. 3: is a vertical view from above.

The wheels 1, 2 are only indicated in FIGS. 1, 2 and 3, they are mounted in wheel carriers 3, 4 in any desired way. The wheel carriers 3, 4 are indicated here schematically only as rods but in reality are spatial structures. First joints 5, 6 are provided at the bottom, and third joints 7, 8 at the top, on the wheel carriers 3, 4. Furthermore, longitudinal links 9, 10 engage on the wheel carriers 3, 4. The are embodied here in one piece with the wheel carriers 3, 4 or connected thereto; they could also be connected in articulated fashion to the wheel carrier in a suspension system which is derived from a McPherson suspension system. The longitudinal links 9, 10 extend forward from the wheel carriers 3, 4, see direction of travel arrow 11. The transverse link is generally designated by 12, see further below.

The longitudinal links 9, 10 are connected to the body of the vehicle (not illustrated) in bearings 13, 14. These bearings are, for example, ball-and-socket joints. Upper transverse links 15, 16 which are guided in bearings 17, 18 on the body of the vehicle, for example by means of ball-and-socket joints, are coupled to the third joints 7, 8. The upper transverse links 15, 16 constitute a further guiding means in the transverse direction which may be embodied in any desired way largely independent of the invention.

The transverse link 12 is embodied as a connecting link between the two wheel carriers 3, 4 and engages on their first joints 5, 6. In the configuration shown, said transverse link 12 follows the connecting link between these two joints, but it can also have a shape which deviates to a great extent from this connecting line between the joints. It has in the center a boom-shaped projection 12' which is integrally or permanently connected to the connecting link 12. Two beams of the boom-shaped projection 12' lie in the longitudinal center plane of the vehicle. At its end, a second joint 19 is provided to which point, the tip of the boom 12' is guided essentially in the vertical direction. As a result, the transverse link 12 can absorb forces in the transverse direction of the vehicle. For this purpose, in the exemplary embodiment shown, a Watt linkage is selected which is composed of a coupling 20 with coupling joints 21, 22 and rockers 23, 24 which are coupled to the body of the vehicle in bearings 25, 26. The second joint 19 is seated in the center of the coupling 20.

As a result of the second joint 19 being guided on the Watt linkage 20 to 24 it is ensured that its point of the connecting link 12 remains unchanged in position when there is spring compression in opposite directions, that is to say acts as a transverse link which is coupled at this point, that, in the case of spring compression on one side, it acts as a transverse link whose position is that of the entire connecting link 12 and that, in the case of spring compression in the same direction, it acts as an infinitely long transverse link. As a result, different changes in wheel position are achieved with spring compression in the same direction and with spring compression in opposite directions. As a result, the entire axle kinematics change as a function of the type of spring compression.

As a result of the difference in height 29 (FIG. 2), this change is particularly advantageous. As a result of the distance 30 (FIG. 3) in the longitudinal direction between the wheel contact point 31 and first joints 5, 6, a desired side force steering effect is additionally achieved.

The former improves the straight-running properties when there is simultaneous spring compression, the latter improves cornering. Within the scope of the invention, solutions which deviate from the described exemplary embodiment, in particular relating to the wheel carrier, the longitudinal link and the further guiding means in the transverse direction (upper transverse links) and their connection to the wheel carrier, are possible.

Figure 4:
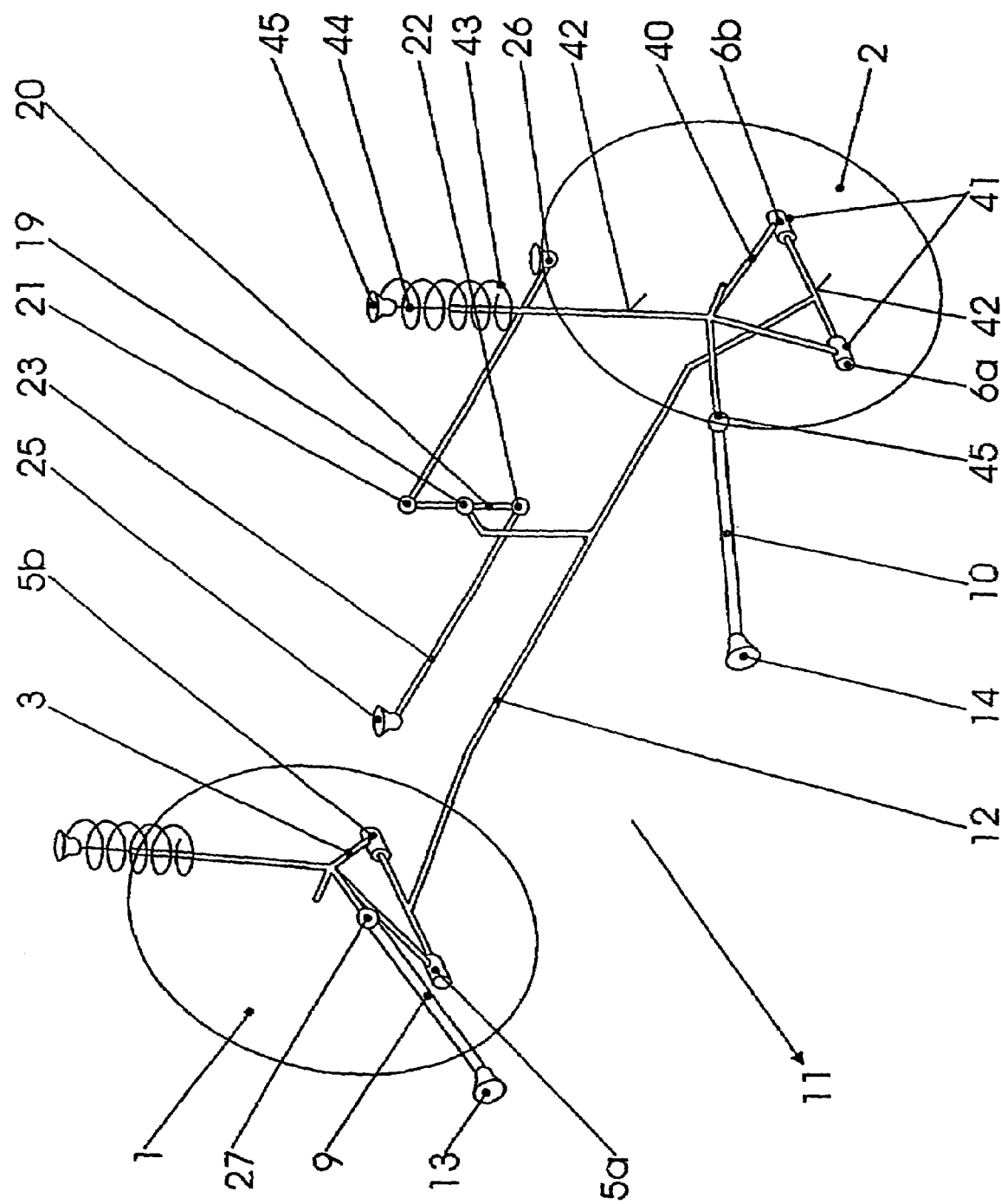
FIG. 4: is an axonometric representation of a modified embodiment.

The embodiment in FIG. 4 differs from that in the previous figures by virtue of the fact that it is a suspension means with telescopic guidance of the wheel carrier, also known by the name McPherson telescopic leg. The wheel carrier 40 has, at its lower end, two joints 41 spaced apart to a certain extent in the longitudinal direction of the vehicle, in which joints a crosshead 42 of the connecting link is mounted in order to prevent the wheel carrier from rotating about a vertical axis. The longitudinal link 10 is connected to the wheel carrier 40 via a joint 45.

The wheel carrier 40 continues in the upward direction in an approximately first vertical rod 42 which forms, together with a coaxial second vertical rod 44 which is supported on the body of the vehicle in a support 45, a telescopic guiding means. It is usually embodied as a damping leg and is surrounded by a helical spring 43 which acts as a compression spring between the first vertical rod 42 and the support 45. The guidance of the vertical link with its two crossheads by the Watt linkage 19 to 24 is as described with respect to FIGS. 1 to 3.

The invention can thus be applied to various axle guiding means.

The invention claimed is:

1. A rear axle suspension system for motor vehicles in which wheel carriers on both sides are coupled to a body of the vehicle in the transverse direction by means of at least one longitudinal link, one transverse link and a further guiding means, characterized in that the transverse link is a single connecting link which is connected to the two wheel carriers via first joints and connects the two wheel carriers and a center of which is guided, with respect to the body of the vehicle, essentially in a longitudinal center plane of the vehicle, by means of a straight-guiding means, the straight-guiding means being a linkage which is composed of two rockers which are transverse with respect to the direction of travel and one coupling which is arranged in an essentially vertical plane.

2. The rear axle suspension system as claimed in claim 1, characterized in that the further guiding means in the transverse direction is a telescopic guiding means between the wheel carrier and the body of the vehicle and the longitudinal links are connected to the wheel carrier by means of a joint.

3. A rear axle suspension system for motor vehicles in which wheel carriers on both sides are coupled to a body of the vehicle in the transverse direction by means of at least one longitudinal link, one transverse link and a further guiding means, characterized in that the transverse link is a single connecting link which is connected to the two wheel carriers via first joints and connects the two wheel carriers and a center of which is guided, with respect to the body of the vehicle, essentially in a longitudinal center plane of the vehicle, by means of a straight-guiding means, the straight-guiding means is a linkage which is composed of two rockers and one coupling which are arranged in an essentially vertical plane which is transverse with respect to the direction of travel, the first joints to which the connecting link is coupled being arranged on the wheel carriers at the bottom, and the connecting link is connected to the coupling of the linkage in the center plane of the connecting line of the two first joints by means of a second joint which is arranged above the connecting line.

4. The rear axle suspension system as claimed in claim 3, characterized in that the further guiding means in the transverse direction is a telescopic guiding means between the wheel carrier and the body of the vehicle and the longitudinal links are connected to the wheel carrier by means of a joint.

5. A rear axle suspension system for motor vehicles in which the wheel carriers on both sides are coupled to a body of the vehicle in the transverse direction by means of at least one longitudinal link, one transverse link and a further guiding means, characterized in that the transverse link is a single connecting link which is connected to the two wheel carriers via first joints and connects the two wheel carriers and a center of which is guided, with respect to the body of the vehicle, essentially in a longitudinal center plane of the vehicle, by means of a straight-guiding means, the longitudinal link being permanently connected to the wheel carrier, the further guiding means in the transverse direction is a transverse link which acts on the wheel carrier at the top by means of a further joint, and the first joint is arranged below and behind a third link in the direction of travel.

6. The rear axle suspension system as claimed in claim 5, characterized in that the further guiding means in the transverse direction is a telescopic guiding means between the wheel carrier and the body of the vehicle and the longitudinal links are connected to the wheel carrier by means of a joint.

7. The rear axle suspension system as claimed in claim 6, characterized in that, the straight-guiding means being a linkage which is composed of two rockers which are transverse with respect to the direction of travel and one coupling which is arranged in an essentially vertical plane.

8. The rear axle suspension system as claimed in claim 6, characterized in that, the straight-guiding means being a linkage which is composed of two rockers and one coupling which are arranged in an essentially vertical plane which is transverse with respect to the direction of travel and the first joints to which the connecting link is coupled being arranged on the wheel carriers at the bottom, and the connecting link is connected to the coupling of the linkage in the center plane of the connecting line of the two first joints by means of a second joint which is arranged above the connecting line.

9. The rear axle suspension system as claimed in claim 5, characterized in that, the straight-guiding means being a linkage which is composed of two rockers and one coupling which are arranged in an essentially vertical plane which is transverse with respect to the direction of travel.

10. The rear axle suspension system as claimed in claim 5, characterized in that, the straight-guiding means being a linkage which is composed of two rockers and one coupling which are arranged in an essentially vertical plane which is transverse with respect to the direction of travel and the first joints to which the connecting link is coupled being arranged on the wheel carriers at the bottom, and the connecting link is connected to the coupling of the linkage in the center plane of the connecting line of the two first joints by means of a second joint which is arranged above the connecting line.

* * * * *